United States Patent
Tsujii et al.

(10) Patent No.: US 7,878,290 B2
(45) Date of Patent: Feb. 1, 2011

(54) SADDLE RIDING TYPE VEHICLE

(75) Inventors: Eiichirou Tsujii, Shizuoka (JP);
Masayuki Hirano, Shizuoka (JP);
Takeshi Toyota, Shizuoka (JP); Sachiyo Hasegawa, Shizuoka (JP); Isao Fujii, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 12/631,906

(22) Filed: Dec. 7, 2009

(65) Prior Publication Data

US 2010/0147615 A1   Jun. 17, 2010

(30) Foreign Application Priority Data

Dec. 16, 2008  (JP) .............................. 2008-319688

(51) Int. Cl.
   *B60K 17/00*  (2006.01)
   *B60G 3/04*   (2006.01)
(52) U.S. Cl. .................. 180/385; 180/215; 280/124.128
(58) Field of Classification Search ................. 180/215, 180/238, 378, 379, 380, 382, 383, 385; 280/124.103, 280/124.116, 124.128, 124.156
   See application file for complete search history.

(56) References Cited

U.S. PATENT DOCUMENTS

| | | | |
|---|---|---|---|
| 4,003,443 A | * | 1/1977 | Boughers .................... 180/217 |
| 4,647,067 A | * | 3/1987 | Paquette et al. ............. 280/676 |
| 5,611,555 A | * | 3/1997 | Vidal .......................... 280/282 |
| 7,419,024 B1 | * | 9/2008 | Tavantzis ..................... 180/210 |
| 2008/0156571 A1 | * | 7/2008 | Kofuji et al. ................. 180/348 |

FOREIGN PATENT DOCUMENTS

JP   61-125973 A   6/1986

* cited by examiner

*Primary Examiner*—Eric Culbreth
*Assistant Examiner*—Joseph Rocca
(74) *Attorney, Agent, or Firm*—Keating & Bennett, LLP

(57) ABSTRACT

A saddle riding type vehicle capable of making turns by leaning a vehicle body includes a pair of rear wheels provided at opposite sides of the vehicle body, a pair of support mechanisms arranged to support the pair of rear wheels to be movable, independently of each other, up and down about a pivot axis relative to the vehicle body, an engine disposed forward of the pivot axis to produce a drive force, a differential mechanism arranged to distribute the drive force of the engine to the pair of rear wheels and to absorb a rotating speed difference between the pair of rear wheels at a time of making a turn, the differential mechanism including drive shafts arranged between the engine and the pivot axis, a pair of shaft drive mechanisms provided for the pair of rear wheels, respectively, and arranged to transmit the drive force of the differential mechanism to the pair of rear wheels, and a pair of constant velocity universal joints provided for the pair of shaft drive mechanisms, respectively, each including a pair of universal joints connected by a coupling yoke, the coupling yoke being located on the pivot axis, and the pair of universal joints being arranged in a positional relationship of point symmetry.

15 Claims, 7 Drawing Sheets

SADDLE RIDING TYPE VEHICLE

BACKGROUND OF THE INVENTION

1. Field of the Invention

The present invention relates to a saddle riding type vehicle such as a three-wheeled or four-wheeled automotive vehicle having a pair of wheels at least at a rear portion of a vehicle body, which can make turns by leaning the vehicle body.

2. Description of the Related Art

Conventionally, this type of vehicle includes a saddle riding type vehicle having two rear driven wheels, which can make turns by leaning a vehicle body. With such a vehicle, it is common practice to drive the two rear wheels with chains instead of driving only one of the rear wheels.

Chains have a characteristic to become elongated through use. In order to assure proper drive, it is necessary to adjust tension of the chains by adjusting positions of the rear wheels. Although the chains of the two rear wheels are adjusted, the two chains usually are different in the degree of elongation. Therefore, when tension of the chains is appropriately adjusted for the two rear wheels, there arises a problem of creating different wheelbases which are the distances between the two rear wheels and front wheel(s).

There exists a three-wheeled vehicle employing a shaft drive in place of the chain drive in order to eliminate the above inconvenience associated with maintenance (see Japanese Unexamined Patent Publication S61-125973 (FIG. 13), for example). This three-wheeled vehicle has front bevel gears provided for a drive shaft of a differential mechanism to transmit output from an engine output shaft in perpendicular directions, and a shaft disposed rearward of each bevel gear to transmit the drive. A rear bevel gear is disposed at the rear end of the shaft to transmit the drive to each rear wheel, thereby to rotate the rear wheels based on the drive. The two rear wheels are rotatably supported by a single rear fork, and each shaft has a universal joint disposed further rearward than a pivot axis of the rear fork.

However, the conventional example with such a construction has the following drawbacks.

The conventional vehicle, with the shaft drive mechanism, can eliminate the inconvenience associated with maintenance. However, because of the positional relationship between the rear fork and universal joint, when the rear end of the rear fork moves very close to the vehicle body, more particularly, when the vehicle body sinks greatly relative to the rear fork or the rear fork flips up relative to the vehicle body, there arises a problem that the engine output cannot be transmitted to the rear wheels efficiently.

In the conventional construction, because the two rear wheels are attached to the single fork, the vehicle body and rear wheels never lean relative to the vertical direction, and thus the rear end of the rear fork rarely moves very close to the vehicle body. However, with a vehicle of the type in which each of the two rear wheels has a single rear fork, and the two rear wheels lean with the vehicle body from the vertical direction, the rear fork of the rear wheel located inward, when in a leaning position, moves very close to the vehicle body with increased frequency. When the technique of the conventional example is applied to that case, the efficiency of transmission will be significantly decreased.

SUMMARY OF THE INVENTION

In view of the above, preferred embodiments of the present invention provide a saddle riding type vehicle which improves transmission efficiency of engine output while improving maintainability.

According to a preferred embodiment of the present invention, a saddle riding type vehicle capable of making turns by leaning a vehicle body includes a pair of rear wheels provided at opposite sides of the vehicle body; a pair of support mechanisms arranged to support the pair of rear wheels to be movable, independently of each other, up and down about a pivot axis relative to the vehicle body; an engine disposed forward of the pivot axis to produce a drive force; a differential mechanism arranged to distribute the drive force of the engine to the pair of rear wheels and to absorb a rotating speed difference between the pair of rear wheels at a time of making a turn, the differential mechanism including drive shafts arranged between the engine and the pivot axis; a pair of shaft drive mechanisms provided for the pair of rear wheels, respectively, and arranged to transmit the drive force of the differential mechanism to the pair of rear wheels; and a pair of constant velocity universal joints provided for the pair of shaft drive mechanisms, respectively, each including a pair of universal joints connected by a coupling yoke; wherein each of the constant velocity universal joints has the coupling yoke located on the pivot axis, and the pair of universal joints are arranged in a positional relationship of point symmetry.

According to a preferred embodiment of the present invention, the pair of shaft drive mechanisms drive the pair of rear wheels through the differential mechanism. Thus, at times of making a turn, smooth turning movement is realized by absorbing a rotating speed difference between the pair of rear wheels. This construction can also solve the problem of maintenance which may occur with a construction using chains for drive transmission. The pair of rear wheels are independently supported by the pair of support mechanisms, and each shaft drive mechanism has a pair of constant velocity universal joints arranged in a positional relationship of point symmetry, with a coupling yoke located in a position coinciding with the pivot axis of the support mechanism. Therefore, even when the vehicle body is leaned and the rear wheel located inward greatly approaches the vehicle body, constant speed drive can be maintained to transmit engine drive to the rear wheels. As a result, the transmission efficiency of engine output can be improved.

The "saddle riding type vehicle" herein includes, in addition to a vehicle driven by the rider straddling the saddle, a scooter type vehicle driven by the rider seated with his or her legs close together. The "vehicle body" refers to a main frame and components fixed to be integral therewith.

In a preferred embodiment of the present invention, it is preferable that the saddle riding type vehicle also includes damper mechanisms disposed between the differential mechanism and the pair of shaft drive mechanisms to absorb torque variations.

Since drive is transmitted through the damper mechanisms, the drive can be transmitted smoothly to the rear wheels by inhibiting the influence of any variations occurring with the output of the engine. Further, stalling of the engine is prevented when its rotating speed falls momentarily due to the rear wheels riding on surface irregularities.

In a preferred embodiment of the present invention, it is preferable that the differential mechanism has drive shafts arranged parallel or substantially parallel to a drive shaft of the gearbox, the drive shafts having a rotation center disposed at a lower level than a rotation center of a crankshaft of the engine.

Then, compactness of the engine can be achieved while realizing smooth turning movement by absorbing a rotating speed difference between the pair of rear wheels.

In a preferred embodiment of the present invention, it is preferable that each of the shaft drive mechanisms includes a first transmission shaft connected to one of the universal joints which is adjacent the differential mechanism, a first bearing arranged to support the first transmission shaft in a position adjacent the differential mechanism, a second transmission shaft connected to the other universal joint which is adjacent to one of the support mechanisms, and a second bearing arranged to support the second transmission shaft in a position adjacent to the one of the support mechanisms.

Since the first transmission shaft includes the first bearing and the second transmission shaft includes the second bearing, wobbling of the first transmission shaft and second transmission shaft is prevented to reduce loss of the drive.

Other features, elements, steps, characteristics and advantages of the present invention will become more apparent from the following detailed description of preferred embodiments of the present invention with reference to the attached drawings.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

FIGS. 6A and 6B are outline views of a double cardon type joint, in which FIG. 6A is a plan view, and FIG. 6B is a side view.

FIGS. 7A and 7B are side views for illustrating movement of rear arms, in which FIG. 7A shows a normal state, and FIG. 7B shows a seat in a sunken state.

DETAILED DESCRIPTION OF THE PREFERRED EMBODIMENTS

A saddle riding type vehicle according to preferred embodiments of the present invention will be described hereinafter with reference to the drawings.

Figure 1:
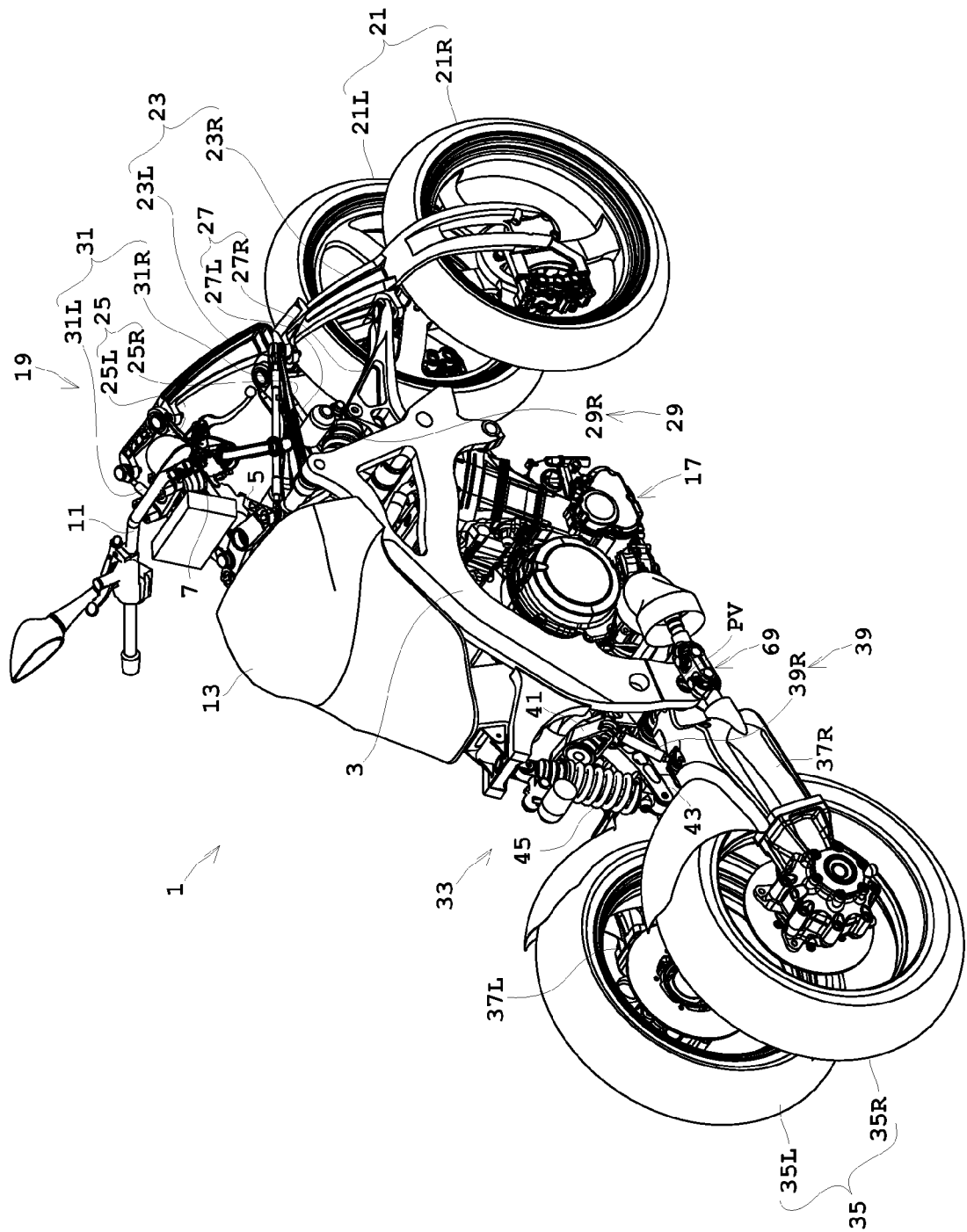
FIG. 1 is a perspective view showing an outline construction of a saddle riding type vehicle according to a preferred embodiment of the present invention.
Figure 2:
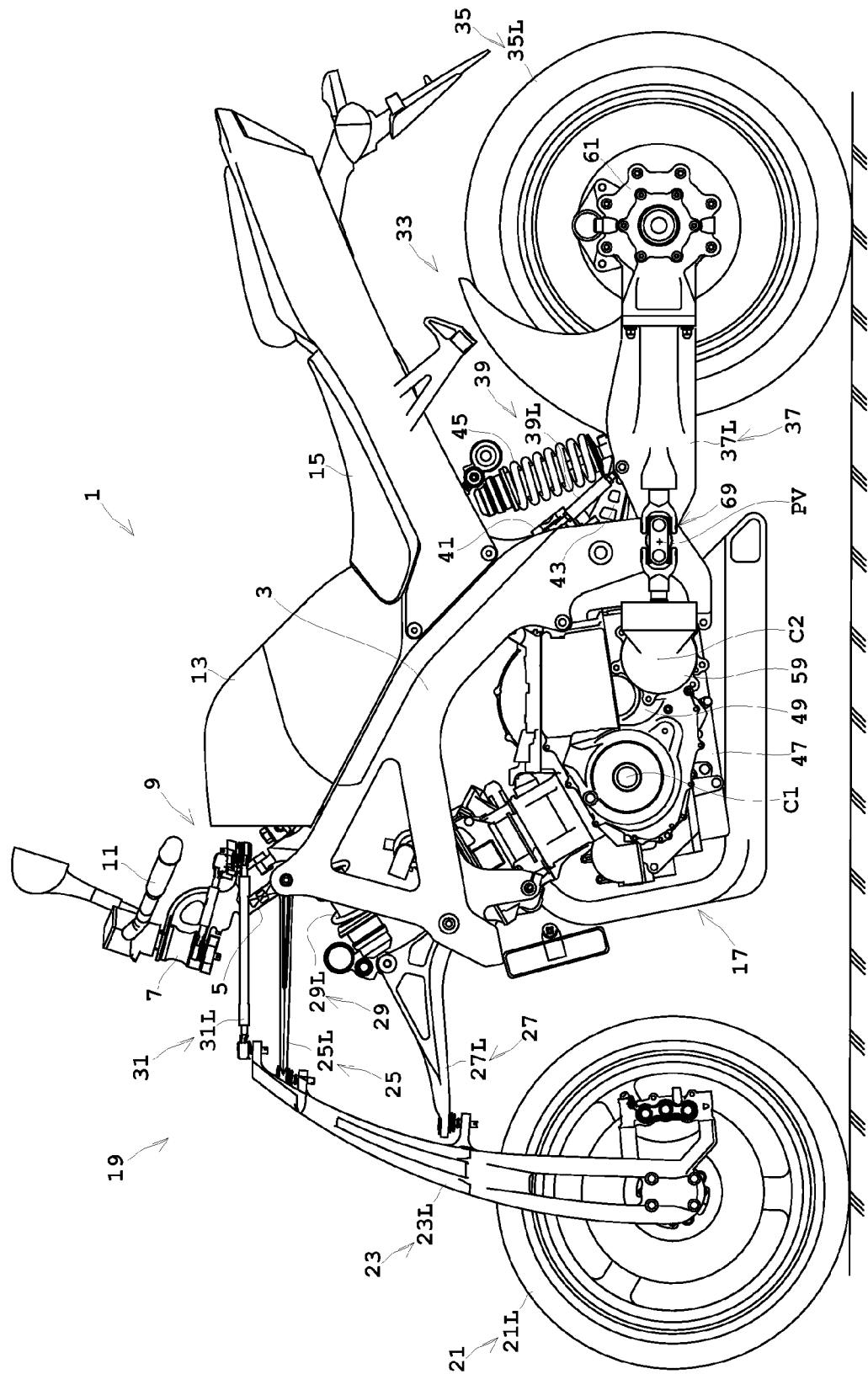
FIG. 2 is a side view showing an outward appearance of the saddle riding type vehicle according to a preferred embodiment of the present invention.
Figure 3:
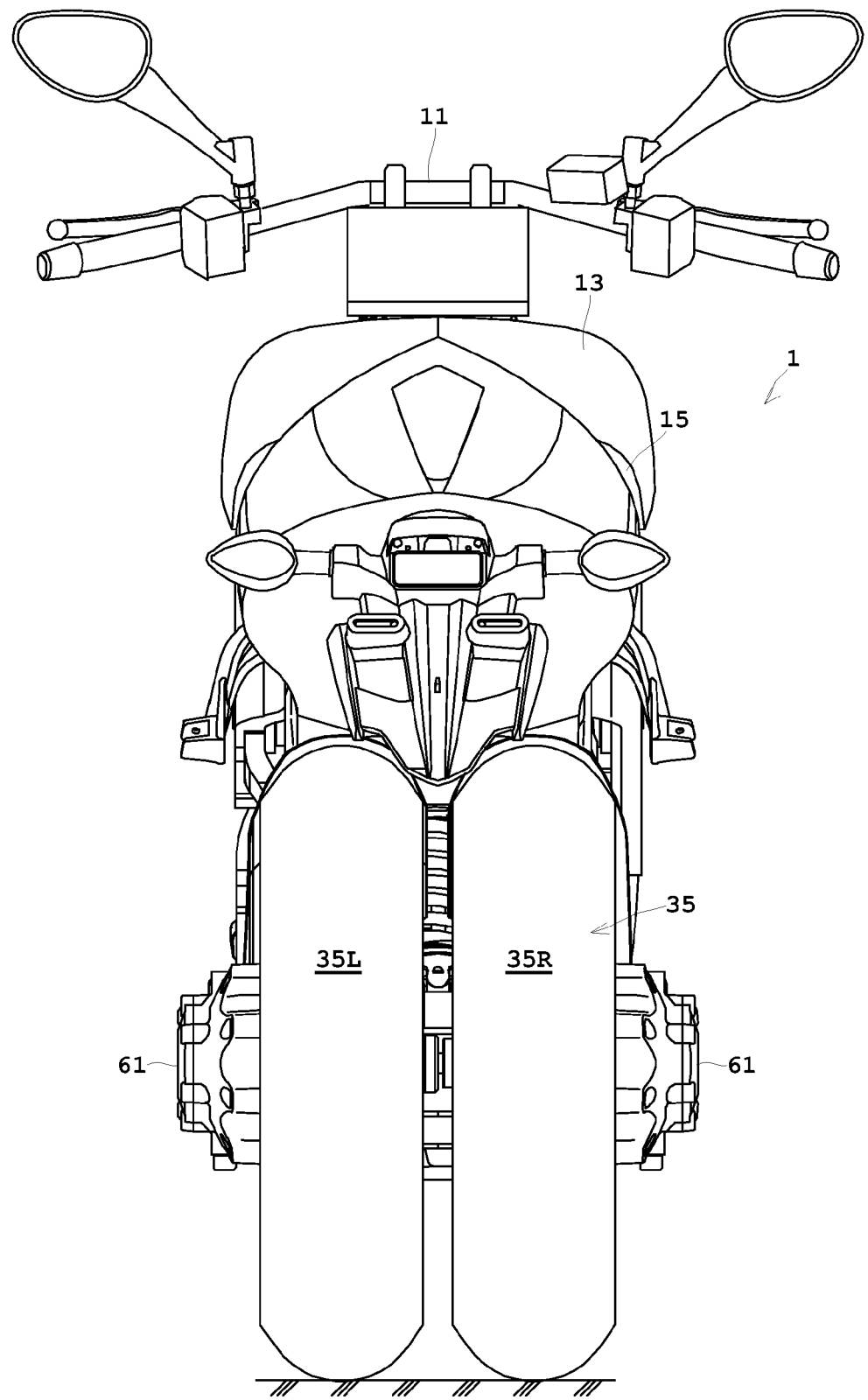
FIG. 3 is a rear view of the saddle riding type vehicle according to a preferred embodiment of the present invention.
Figure 4:
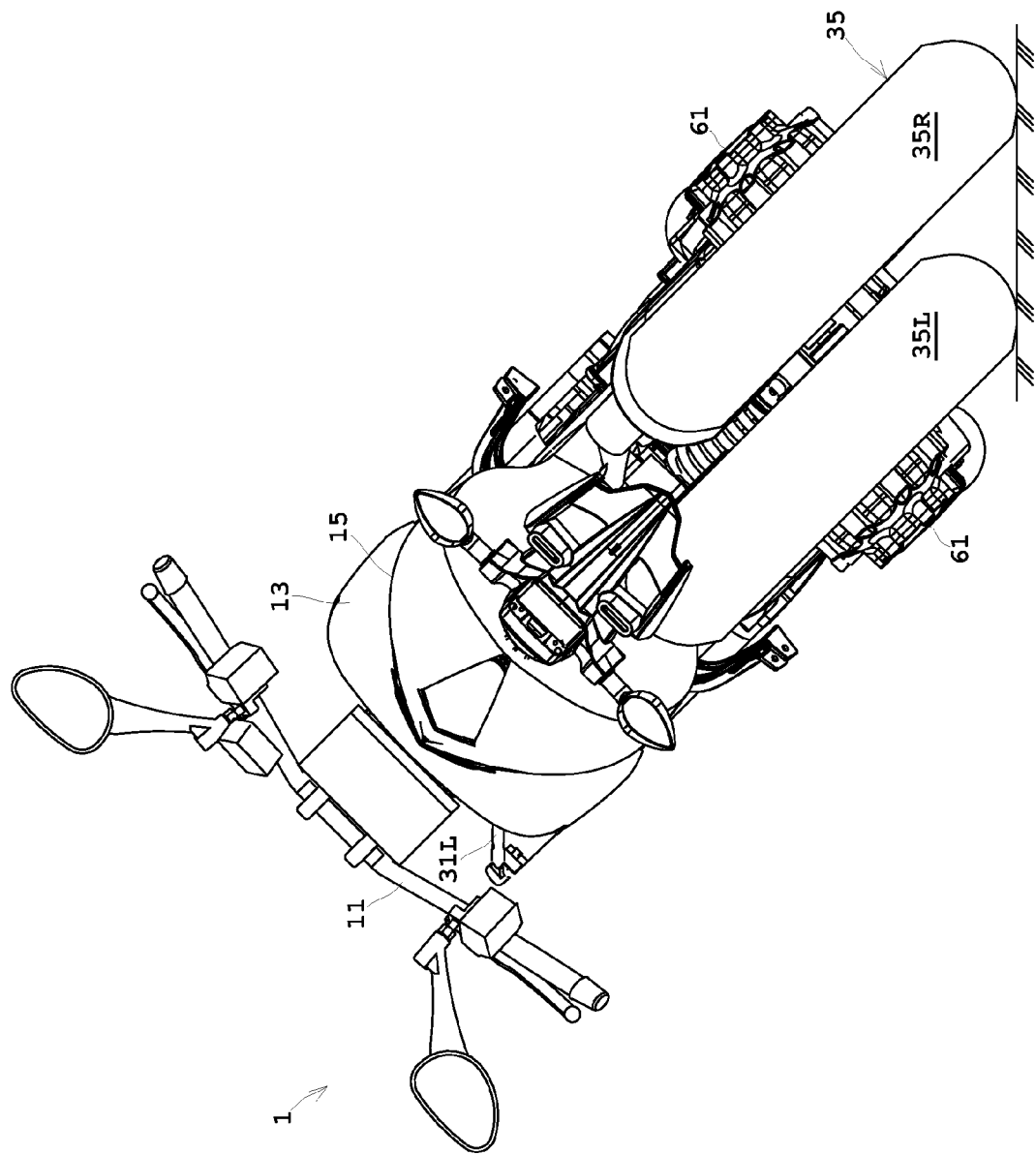
FIG. 4 is a rear view of the saddle riding type vehicle in a leaning state.
Figure 5:
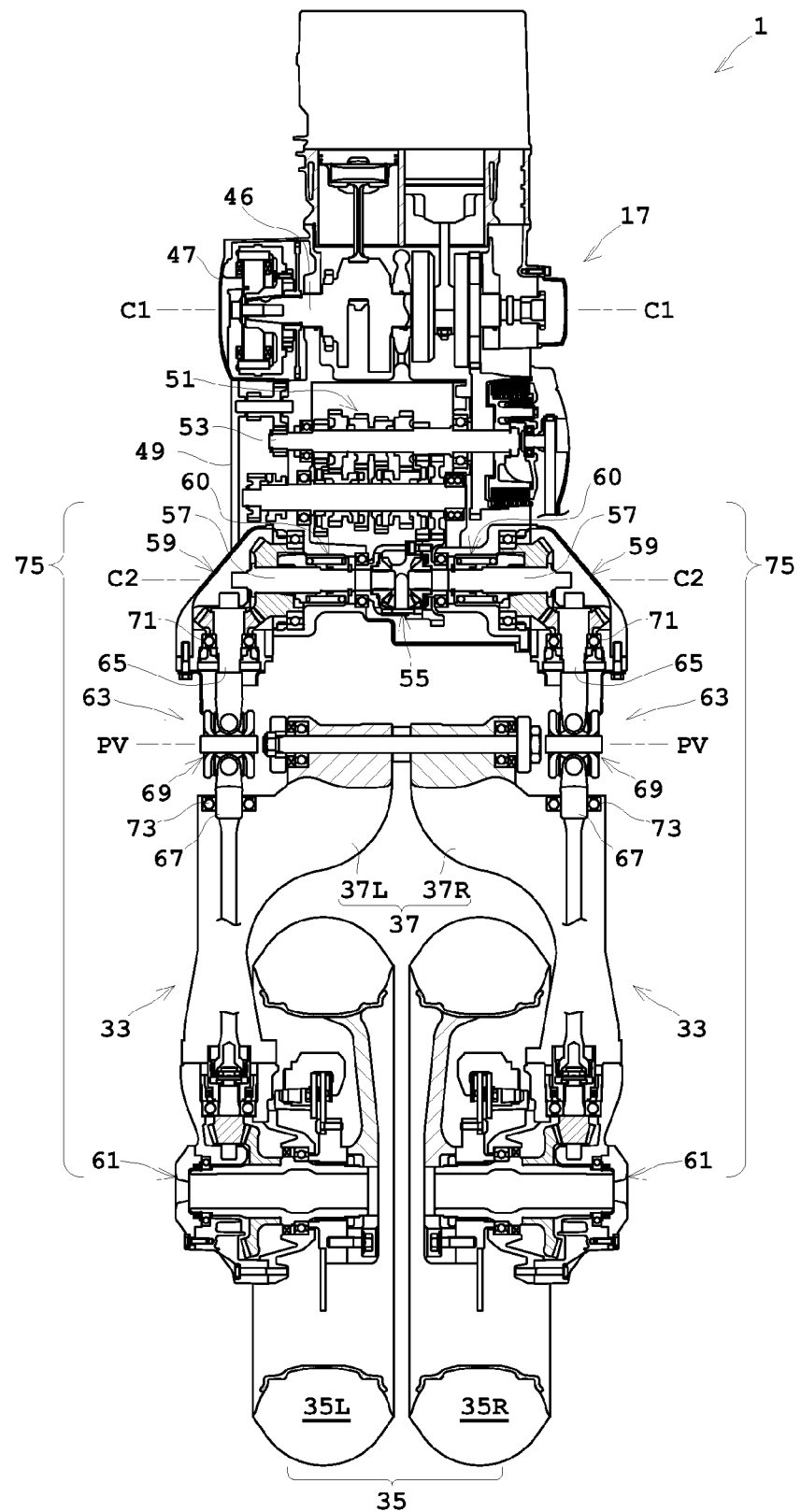
FIG. 5 is a view in cross section of the vehicle from an engine to rear wheels.

FIG. 1 is a perspective view showing an outline construction of a saddle riding type vehicle according to a preferred embodiment of the present invention. FIG. 2 is a side view showing an outward appearance of the saddle riding type vehicle according to a preferred embodiment of the present invention. FIG. 3 is a rear view of the saddle riding type vehicle according to a preferred embodiment of the present. The seat illustrated in FIGS. 2 through 4, for example, is omitted from FIG. 1. FIG. 4 is a rear view of the saddle riding type vehicle in a leaning state. FIG. 5 is a view in cross section of the vehicle from an engine to rear wheels. The terms "right", "left", "front" and "rear" used in the following description to indicate directions refer to the right, left, front and rear seen from the rider seated on the saddle riding type vehicle.

The saddle riding type vehicle 1 in this preferred embodiment preferably is an automotive four-wheeled vehicle having pairs of wheels at the front and rear of a vehicle body, respectively. The saddle riding type vehicle 1 has a main frame 3 disposed around the center of the vehicle body. The main frame 3 includes a head pipe 7 attached to a forward end thereof (at the right in FIG. 1 and the left in FIG. 2) through a support frame 5. The head pipe 7 has a handlebar 11 attached thereto and interlocked to a steering link mechanism 9. A fuel tank 13 is mounted on the main frame 3 rearward of the handlebar 11, and a seat 15 is mounted rearward of the fuel tank 13. An engine 17 is mounted in a lower portion of the main frame 3 below the fuel tank 13.

A pair of front wheels 21 (right front wheel 21R and left front wheel 21L) are supported through a suspension mechanism 19 forward of the main frame 3. The suspension mechanism 19 includes a pair of knuckle arms 23, a pair of upper arms 25, a pair of lower arms 27 and a pair of shock absorbers 29.

The pair of knuckle arms 23 include a right knuckle arm 23R arranged to rotatably support the right front wheel 21R at a lower inward side thereof, and a left knuckle arm 23L arranged to rotatably support the left front wheel 21L at a lower inward side thereof. The pair of upper arms 25 include a right upper arm 25R connecting an upper position of the main frame 3 and an upper position of the right knuckle arm 23R in a way to allow the latter to move up and down, and a left upper arm 25L connecting an upper position of the main frame 3 and an upper position of the left knuckle arm 23L in a way to allow the latter to move up and down. The pair of lower arms 27 include a right lower arm 27R connecting a middle position of the right knuckle arm 23R and the main frame 3 in a way to allow the former to move up and down, and a left lower arm 27L connecting a middle position of the left knuckle arm 23L and the main frame 3 in a way to allow the former to move up and down. The right lower arm 27R has a right shock absorber 29R (see FIG. 1) attached thereto and connected to one end of a balance beam (not shown) rockably attached to a portion of the main frame 3. The left lower arm 27L has a left shock absorber 29L (see FIG. 2) attached thereto and connected to the other end of the balance beam (not shown).

The steering link mechanism 9 noted above is connected to a pair of steering rods 31. The pair of steering rods 31 include a right steering rod 31R connected to an upper end of the right knuckle arm 23R and the steering link mechanism 9, and a left steering rod 31L connected to an upper end of the left knuckle arm 23L and the steering link mechanism 9. With this construction, the pair of front wheels 21 sway right and left as interlocked to the handlebar 11. Further, through the suspension mechanism 19 noted above, the pair of front wheels 21 are movable up and down relative to the main frame 3.

The pair of knuckle arms 23 noted above correspond to the "pair of support mechanisms" in this invention.

A pair of rear wheels 35 (right rear wheel 35R and left rear wheel 35L) are supported through a rear suspension mechanism 33 adjacent and rearward of the seat 15. The rear suspension mechanism 33 includes a pair of rear arms 37, a pair of rods 39, a stabilizer 41, a link mechanism 43 and a shock absorber 45.

The pair of rear arms 37 include a right rear arm 37R having one end thereof attached to the main frame 3 to be rockable about a pivot axis PV, and the other end rotatably supporting the right rear wheel 35R at an inward side thereof. The pair of rear arms 37 include also a left rear arm 37L having one end thereof attached to the main frame 3 to be rockable about the pivot axis PV, and the other end rotatably supporting the left rear wheel 35L at an inward side thereof. The pair of rods 39 include a right rod 39R attached to the right rear arm 37R and to one end of the stabilizer 41, and a left rod 39L attached to the left rear arm 37L and to the other end of the stabilizer 41. The stabilizer 41 is interlocked to the shock absorber 45 through the link mechanism 43. The pair of rear wheels 35 are movable up and down through the rear suspension mechanism 33 constructed in this way.

With the suspension mechanism 19 and rear suspension mechanism 33 constructed as described above, the vehicle body can change from an upright position as shown in FIG. 3 to a position leaning left from the vertical direction as shown in FIG. 4. Although not shown, the vehicle body can also take a position leaning right from the vertical direction.

The pair of rear arms 37 noted above correspond to the "pair of support mechanisms" according to a preferred embodiment of the present invention.

As shown in FIG. 5, the engine 17 has a gearbox case 49 disposed in a rearward position in a crankcase 47 housing a crankshaft 46. A gearbox (transmission) 51 is mounted in the gearbox case 49. A main shaft 53 is located in the gearbox case 49. Rearward of the gearbox case 49 is a differential mechanism 55 having an LSD (Limited Slip Differential) function arranged to restricting differential action. The differential mechanism 55 includes a pair of output shafts 57 arranged to transmit drive rearward through bevel gears 59. Damper mechanisms 60 are provided for the pair of output shafts 57 of the differential mechanism 55. These damper mechanisms 60 serve to absorb torque variations.

The saddle riding type vehicle 1 in this preferred embodiment transmits drive through the damper mechanisms 60, and can therefore transmit drive smoothly to the right rear wheel 35R and left rear wheel 35L by inhibiting the influence of any variations occurring with the output of the engine 17. Further, stalling of the engine 17 is prevented when its rotating speed falls momentarily due to the right rear wheel 35R or left rear wheel 35L riding on surface irregularities. The differential mechanism 55 disposed rearward of the crankcase 47 containing the gearbox 51 contributes to compactness of the engine 17. The differential mechanism 55, with the LSD built in, can transmit drive reliably to either one of the rear wheels 35 on bad roads or in slippery surface conditions, to thereby provide a steady run.

The differential mechanism 55 includes the output shafts 57 arranged parallel or substantially parallel to the main shaft 53 of the gearbox 51 and, as shown in FIG. 2, the rotation center C2 of the output shafts 57 is disposed at a lower level than the rotation center C1 of the crankshaft 46. Therefore, compactness (e.g., reduced fore and aft length) of the engine 17 can be achieved while realizing smooth turning movement by absorbing a rotating speed difference between the pair of rear wheels 35.

Each of the rear arms 37 includes a bevel gear 61 disposed at the end thereof remote from the pivot axis PV. Output shafts of these bevel gears 61 are connected to the pair of rear wheels 35, respectively. The bevel gears 59 and bevel gears 61 are interlocked through drive shafts 63. The drive shafts 63 have, for example, double cardon type joints 69 as constant velocity universal joints disposed in positions of connection between first transmission shafts 65 adjacent the bevel gears 59 and second transmission shafts 67 adjacent the bevel gears 61. The bevel gears 59 include first bearings 71 attached thereto to support the first transmission shafts 65, while the rear arms 37 include second bearings 73 attached thereto to support the second transmission shafts 67. The first bearings 71 and second bearings 73 arranged in this way can inhibit wobbling of the first transmission shafts 65 and second transmission shafts 67 to reduce loss of the drive.

The bevel gears 59 and 61 and drive shafts 63 described above constitute shaft drive mechanisms 75.

Figure 6A:
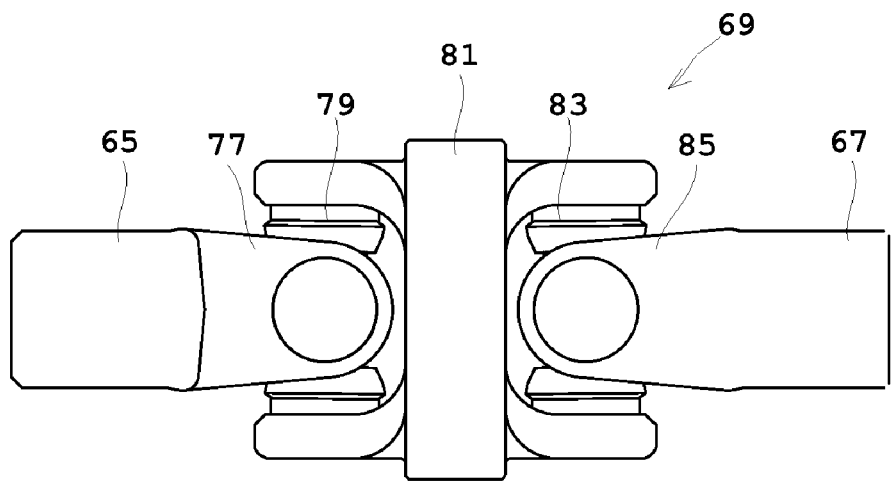
Figure 6B:
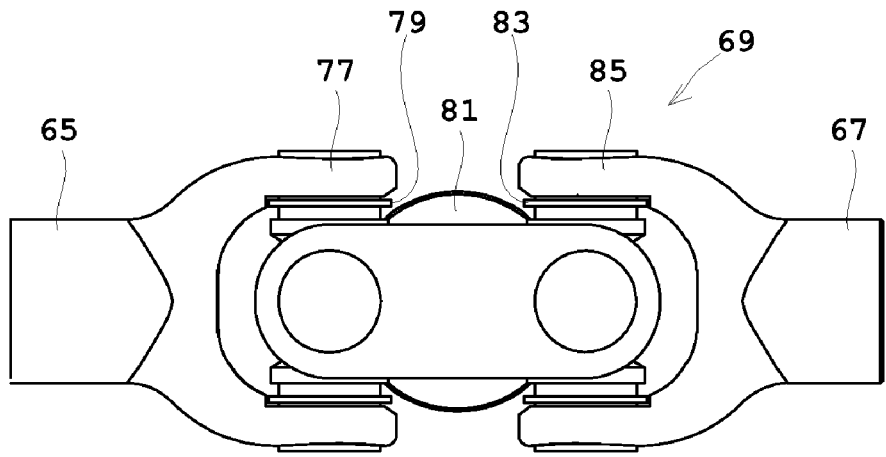

The double cardon type joints 69 will now be described with reference to FIGS. 6A and 6B. FIGS. 6A and 6B are outline views of a double cardon type joint, in which FIG. 6A is a plan view, and FIG. 6B is a side view.

Each double cardon type joint 69 preferably has a construction combining two cardon type joints (also called universal joints). Specifically, each double cardon type joint 69 includes a pin yoke 77, a cross pin 79, a coupling yoke 81, a cross pin 83 and a pin yoke 85. The pin yoke 77 has one arm of the cross pin 79 rotatably attached thereto, while the coupling yoke 81 has the other arm of the cross pin 79 rotatably attached to one end thereof. The coupling yoke 81 has one arm of the cross pin 83 rotatably attached to the other end thereof, while the pin yoke 85 has the other arm of the cross pin 83 rotatably attached thereto.

With each double cardon type joint 69 constructed in this way, even when bent, the pin yoke 77 and pin yoke 85 remain equiangular relative to the coupling yoke 77. This cancels out a speed difference between the first transmission shaft 65 and second transmission shaft 67 to obtain an equal speed. Thus, unequal speed rotation can be eliminated to provide an equal speed relationship between input shaft and output shaft.

In the shaft drive mechanisms 75 described above, as shown in FIGS. 2 and 5, the coupling yoke 81 of each double cardon type joint 69 is located on the pivot axis PV, and the pin yokes 77 and 85 are arranged in a positional relationship of point symmetry.

Figure 7A:
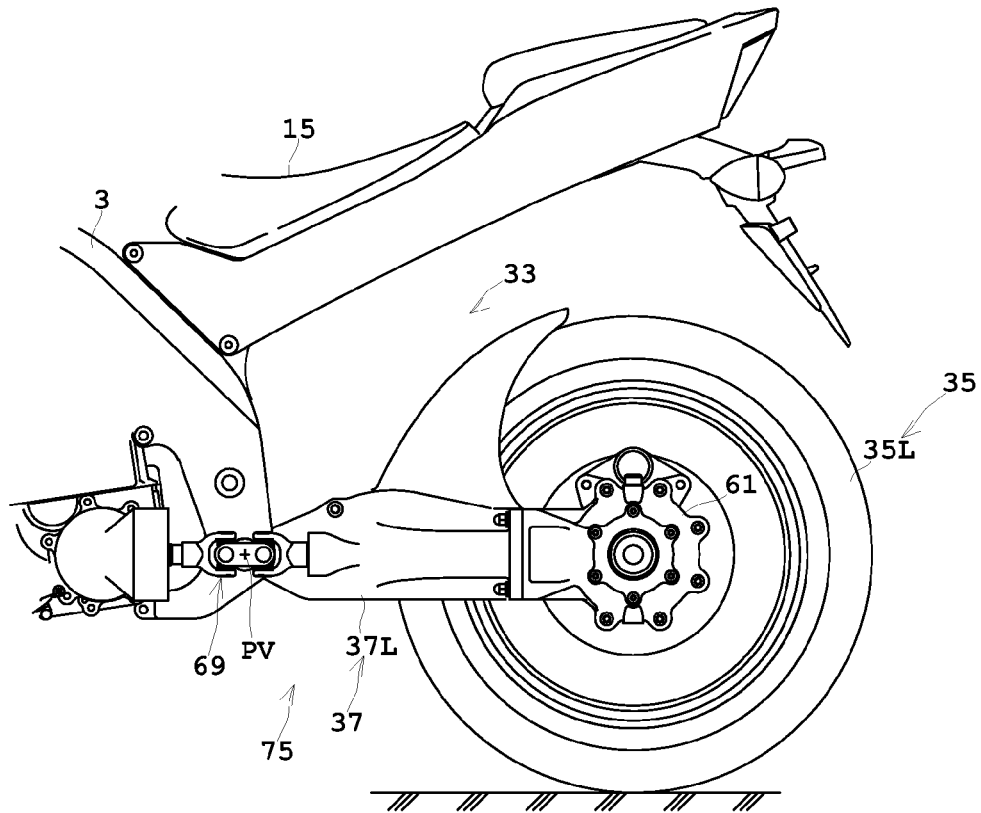
Figure 7B:
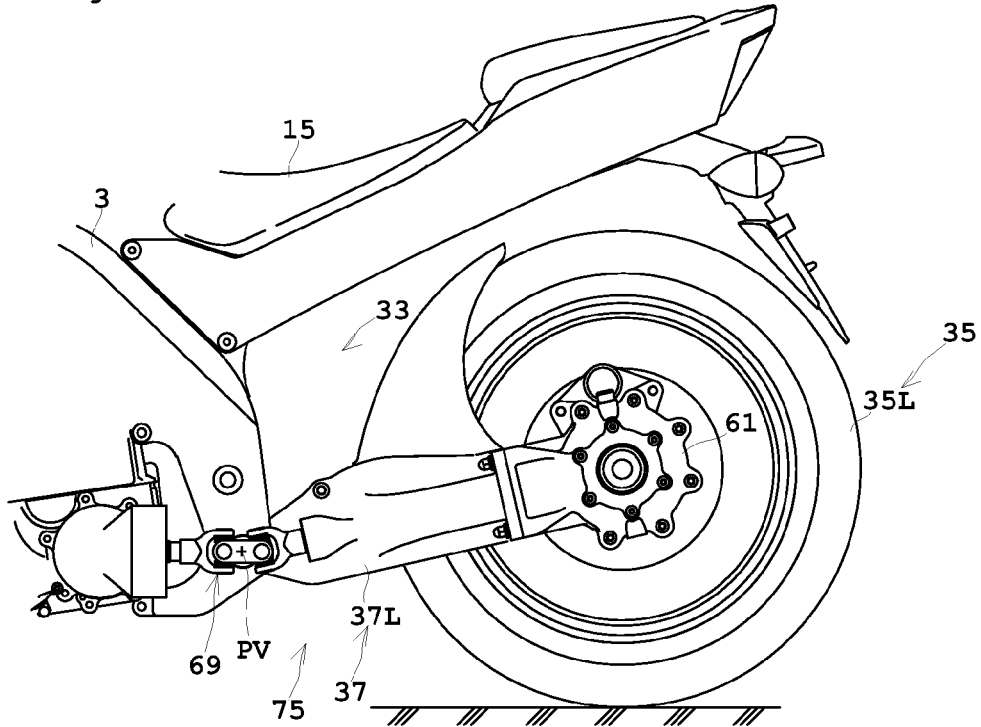

Reference is now made to FIGS. 4, 7A and 7B. FIGS. 7A and 7B are side views for illustrating movement of the rear arms, in which FIG. 7A shows a normal state, and FIG. 7B shows the seat in a sunken state.

The saddle riding type vehicle 1 constructed as described above will be in a state as shown in FIG. 4 when making a left turn, for example. That is, the left rear wheel 35L moves much closer to the seat 15 than does the right rear wheel 35R. Specifically, with respect to the left rear wheel 35L, the seat 15 changes from the state shown in FIG. 7A to the deeply sunken state shown in FIG. 7B, for example. At this time, the left rear arm 37L has the rear end thereof in a state of being flipped up about the pivot axis PV, and the shaft drive mechanism 75 is bent by a large degree. Such a large bending is rare with motorcycles and the type of vehicles having a pair of rear wheels not leaning from the vertical direction. The saddle riding type vehicle 1 in this preferred embodiment includes the shaft drive mechanisms 75 with the double cardon type joints 69. The left double cardon type joint 69 is in a positional relationship of point symmetry, with the coupling yoke 81 located in a position coinciding with the pivot axis PV of the left rear arm 37L. Therefore, even when the vehicle body is leaned and the left rear wheel 35L located inward greatly approaches the vehicle body, the double cardon type joint 69 can move smoothly in bending in response to rocking of the left rear arm 37L, thereby smoothly transmitting the drive from the engine 17 to the left rear wheel 35L. In other words, the constant speed drive through the shaft drive mechanism 75 can be maintained to transmit the engine drive to the rear wheel. As a result, the transmission efficiency of engine output can be improved. When making a right turn also, the drive of the engine 17 can be transmitted smoothly to the right rear wheel 35R.

The saddle riding type vehicle 1 in this preferred embodiment has the pair of front wheels 21 and the pair of rear wheels 35 attached inward of the pair of knuckle arms 23 and the pair of rear arms 37, respectively. Thus, the pairs of front and rear wheels 21 and 35 can be contained within the vehicle width, thereby realizing a vehicle width similar to that of an ordinary two-wheeled vehicle.

The present invention is not limited to the foregoing preferred embodiment, but may be modified in many ways, and at least as described in the following paragraphs.

The foregoing preferred embodiment preferably provides the damper mechanisms 60 between the differential mechanism 55 and shaft drive mechanisms 75. These damper mechanisms 60 are not indispensable. The damper mechanisms 60 may be provided in a position different from the above position.

In the foregoing preferred embodiment, the differential mechanism 55 is preferably integral with the engine 17, but may be formed separately from the engine 17.

In the foregoing preferred embodiment, the output shafts 57 of the differential mechanism 55 are preferably arranged parallel or substantially parallel to the main shaft 53 of the gearbox 51, and the rotation center C2 of the output shafts 57 is disposed at a lower level than the rotation center C1 of the crankshaft 46. The present invention is not limited to such arrangement.

In the foregoing preferred embodiment, the pair of front wheels 21 and the pair of rear wheels 35 are preferably attached inward of the pair of knuckle arms 23 and the pair of rear arms 37, respectively. It is also possible to employ a construction in which the wheels are attached outward of the arms.

The foregoing preferred embodiment has been described taking the double cardon type joints as an example of constant velocity universal joints. The present invention is not limited to the double cardon type joints. As constant velocity universal joints, Zepper type or tripod type universal joints can be used, for example.

The foregoing preferred embodiment shows, by way of example, the four-wheeled automotive vehicle having the pairs of wheels 21 and 35 at the front and rear of the vehicle body. The vehicle may have one wheel at the front of the vehicle body.

The present invention may be embodied in other specific forms without departing from the spirit or essential attributes thereof and, accordingly, reference should be made to the appended claims, rather than to the foregoing specification, as indicating the scope of the invention.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A saddle riding type vehicle capable of making turns by leaning a vehicle body, comprising:
    a pair of rear wheels provided at opposite sides of the vehicle body;
    a pair of support mechanisms arranged to support the pair of rear wheels to be movable, independently of each other, up and down about a pivot axis relative to the vehicle body;
    an engine disposed forward of the pivot axis to produce a drive force;
    a differential mechanism arranged to distribute the drive force of the engine to the pair of rear wheels and to absorb a rotating speed difference between the pair of rear wheels at a time of making a turn, the differential mechanism including drive shafts arranged between the engine and the pivot axis;
    a pair of shaft drive mechanisms provided for the pair of rear wheels, respectively, and arranged to transmit the drive force of the differential mechanism to the pair of rear wheels; and
    a pair of constant velocity universal joints provided for the pair of shaft drive mechanisms, respectively, each including a pair of universal joints connected by a coupling yoke; wherein
    each of the constant velocity universal joints includes the coupling yoke located on the pivot axis, and the pair of universal joints arranged in a positional relationship of point symmetry.

2. The saddle riding type vehicle according to claim 1, further comprising damper mechanisms disposed between the differential mechanism and the pair of shaft drive mechanisms so as to absorb torque variations.

3. The saddle riding type vehicle according to claim 2, wherein the differential mechanism is disposed in a case housing a gearbox.

4. The saddle riding type vehicle according to claim 3, wherein the differential mechanism has the drive shafts arranged parallel or substantially parallel to a drive shaft of the gearbox, the drive shafts having a rotation center disposed at a lower level than a rotation center of a crankshaft of the engine.

5. The saddle riding type vehicle according to claim 2, wherein the differential mechanism includes a limited slip differential arranged to restrict a differential amount.

6. The saddle riding type vehicle according to claim 2, wherein each of the shaft drive mechanisms includes a first transmission shaft connected to one of the universal joints which is adjacent the differential mechanism, a first bearing arranged to support the first transmission shaft in a position adjacent the differential mechanism, a second transmission shaft connected to the other universal joint which is adjacent one of the support mechanisms, and a second bearing arranged to support the second transmission shaft in a position adjacent the one of the support mechanisms.

7. The saddle riding type vehicle according to claim 2, wherein the vehicle body includes a main frame having the engine and the pair of support mechanisms attached thereto, and a support mechanism arranged to support one front wheel relative to the main frame or a pair of support mechanisms arranged to support a pair of front wheels to be movable, independently of each other, up and down relative to the main frame.

8. The saddle riding type vehicle according to claim 7, wherein the pair of front wheels are attached inward of the pair of support mechanisms, and the pair of rear wheels are attached inward of the pair of support mechanisms.

9. The saddle riding type vehicle according to claim 1, wherein the differential mechanism is disposed in a case housing a gearbox.

10. The saddle riding type vehicle according to claim 9, wherein the differential mechanism has the drive shafts arranged parallel or substantially parallel to a drive shaft of the gearbox, the drive shafts having a rotation center disposed at a lower level than a rotation center of a crankshaft of the engine.

11. The saddle riding type vehicle according to claim 9, wherein each of the shaft drive mechanisms includes a first transmission shaft connected to one of the universal joints which is adjacent the differential mechanism, a first bearing arranged to support the first transmission shaft in a position adjacent the differential mechanism, a second transmission shaft connected to the other universal joint which is adjacent one of the support mechanisms, and a second bearing arranged to support the second transmission shaft in a position adjacent the one of the support mechanisms.

12. The saddle riding type vehicle according to claim 1, wherein the differential mechanism includes a limited slip differential arranged to restrict a differential amount.

13. The saddle riding type vehicle according to claim 1, wherein each of the shaft drive mechanisms includes a first transmission shaft connected to one of the universal joints which is adjacent the differential mechanism, a first bearing arranged to support the first transmission shaft in a position adjacent the differential mechanism, a second transmission shaft connected to the other universal joint which is adjacent one of the support mechanisms, and a second bearing arranged to support the second transmission shaft in a position adjacent the one of the support mechanisms.

14. The saddle riding type vehicle according to claim 1, wherein the vehicle body includes a main frame having the engine and the pair of support mechanisms attached thereto, and a support mechanism arranged to support one front wheel relative to the main frame or a pair of support mechanisms arranged to support a pair of front wheels to be movable, independently of each other, up and down relative to the main frame.

15. The saddle riding type vehicle according to claim 14, wherein the pair of front wheels are attached inward of the pair of support mechanisms, and the pair of rear wheels are attached inward of the pair of support mechanisms.

* * * * *